United States Patent
Hilmarsson et al.

(10) Patent No.: US 10,398,133 B2
(45) Date of Patent: Sep. 3, 2019

(54) CONCENTRATION CONTROL OF LIVING ORGANISMS IN FLUID

(71) Applicant: VAKI FISKELDISKERFI HF, Kopavogur (IS)

(72) Inventors: Gunnar Sigvaldi Hilmarsson, Reykjavik (IS); Sverrir Hakonarson, Reykjavik (IS)

(73) Assignee: Vaki Fiskeldiskerfi HF, Kopavogur (IS)

( * ) Notice: Subject to any disclaimer, the term of this patent is extended or adjusted under 35 U.S.C. 154(b) by 369 days.

(21) Appl. No.: 15/310,345

(22) PCT Filed: May 12, 2015

(86) PCT No.: PCT/IS2015/050007
§ 371 (c)(1),
(2) Date: Nov. 10, 2016

(87) PCT Pub. No.: WO2015/173837
PCT Pub. Date: Nov. 19, 2015

(65) Prior Publication Data
US 2017/0238512 A1    Aug. 24, 2017

(30) Foreign Application Priority Data
May 12, 2014 (IS) ................................. 9048

(51) Int. Cl.
*A01K 61/00* (2017.01)
*A01K 61/90* (2017.01)
(Continued)

(52) U.S. Cl.
CPC .............. *A01K 61/90* (2017.01); *A01K 61/10* (2017.01); *A01K 63/047* (2013.01)

(58) Field of Classification Search
CPC ........ A01K 61/10; A01K 61/90; A01K 61/95; A01K 63/047
See application file for complete search history.

(56) References Cited

U.S. PATENT DOCUMENTS

| 4,046,996 A | 9/1977 | Williams et al. |
| 4,351,438 A * | 9/1982 | Morton ................... B07B 13/04 119/216 |

(Continued)

FOREIGN PATENT DOCUMENTS

| EP | 2439681 A1 | 4/2012 |
| NO | 314481 B1 | 3/2003 |

(Continued)

OTHER PUBLICATIONS

International Search Report and Written Opinion for PCT/IS2015/050007; dated Sep. 9, 2015; 12 pages.

*Primary Examiner* — Kathleen I Alker
(74) *Attorney, Agent, or Firm* — Quarles & Brady LLP

(57) ABSTRACT

A method, a device and a fish-farm for controlling the concentration of living organisms in fluid in order to facilitate the handling of the organisms such as grading and counting. The apparatus comprises a first in-feed channel for a flow of living organisms, a second in-feed channel for a flow of fluid, a chamber containing a lever for regulating the flows from the first and the second in-feed channels through the chamber, an outlet, a computer, and a sensor. The sensor is positioned in the first in-feed channel for detecting the density of living organism in the flow, and the computer continuously and automatically regulates the ratio of flows from the first and the second in-feed channels through the chamber and towards the outlet by the lever in response to the density of living organisms in the flows determined by the sensor.

15 Claims, 5 Drawing Sheets

(51) Int. Cl.
*A01K 61/10* (2017.01)
*A01K 63/04* (2006.01)

(56) References Cited

U.S. PATENT DOCUMENTS

| | | | | |
|---|---|---|---|---|
| 4,601,083 | A * | 7/1986 | Shoji | A22C 25/12 |
| | | | | 452/157 |
| 4,743,742 | A * | 5/1988 | Espedalen | A01K 61/90 |
| | | | | 119/215 |
| 6,192,833 | B1 * | 2/2001 | Brune | A01K 61/10 |
| | | | | 119/204 |
| 6,273,639 | B1 * | 8/2001 | Eikrem | E02B 8/085 |
| | | | | 405/83 |
| 6,325,570 | B1 * | 12/2001 | Pohjamo | E02B 8/085 |
| | | | | 405/81 |
| 9,210,915 | B2 * | 12/2015 | Kunnen | A22C 25/04 |
| 10,117,441 | B2 * | 11/2018 | Goodrick | A22B 1/00 |
| 10,154,656 | B2 | 12/2018 | Petursson et al. | |
| 2004/0244712 | A1 | 12/2004 | Massey et al. | |
| 2017/0241892 | A1 * | 8/2017 | Brubacher | G06K 9/00134 |

FOREIGN PATENT DOCUMENTS

| | | |
|---|---|---|
| SU | 995716 A1 | 2/1983 |
| WO | 199103029 A1 | 3/1991 |
| WO | 2012038415 A1 | 3/2012 |
| WO | 2015173837 A1 | 11/2015 |

\* cited by examiner

CONCENTRATION CONTROL OF LIVING ORGANISMS IN FLUID

FIELD OF THE INVENTION

The invention comprises a method, a device and a system for controlling the concentration of living organisms in water in order to facilitate the handling of the organisms such as grading and counting. The invention is suited for handling live fish in fish-farming.

BACKGROUND OF THE INVENTION

The prior art in the field shows various devices for counting and sorting organisms in water were the object is to give the optimal registration of number and size. These devices are often limited in their capacity of processing large amounts of fish in a short time interval. The relatively unstable concentration of the fish in water, that goes through the handling systems means that they need to be designed to handle peak density. If not, the devices will not be functioning at full capacity during most of the sorting and counting process.

In order to prevent overloading of the equipment, some prior art inventions have solved the problem by reducing the speed of flow towards the counting device and then increase the speed while measurement occurs. International patent application WO 2012/038415 (Wingtech) discloses a system for registration of number and/or weight distribution of marine organisms where an injection duct is connected upstream to the registration container, and an outlet duct connected downstream of the registration container, forming a feed-back loop of fluid. The water is looped around the counting segment in order to increase the velocity within the registration container. International patent application WO 91/03029 (Kvassheim) shows a device for recording of number and size of objects passing between a light source and a camera in free fall.

The prior art does not describe methods that directly control the concentration of living organisms in water in order to minimize the variance and stabilize the concentration which is needed for optimal operation of both counting and sorting devices.

Experience gained by using conventional methods to count and sort fish shows that those methods tend to function best with a low or moderate level of fish concentration. High levels of concentration have a negative effect on both counting and sorting of fish.

When transferring fish in fish-farms between receptacles, it is standard procedure to count the fish in order to keep better control of the batches. A known disadvantage is that while pumping up fish from one container and directing it to another, the concentration of the fish in water is uneven, giving imprecise counting. The fish tend to clump together which gives inexact and misleading counting as some fish overlap others, thus reducing the counted number.

SUMMARY OF THE INVENTION

The objective of the present invention is to provide a method and a device for optimal registration of organisms in fluid by regulating the concentration and speed of flow of organisms. The invention disclosed also eliminates the need to drain water from the fish while counting which further provides a means for counting organisms without harming or upsetting them in any way. The invention provides for a non-touch method for counting living organisms in fluid. The device disclosed is easily integrated into existing handling systems in fish farms and is less bulky than known systems used for the same purpose. The high variance of concentration during counting and sorting forces manufacturers of fish counters and graders to design the instruments so that they can handle a wide range of concentration, which increases manufacturing cost and reduces efficiency of the equipment.

The present invention in useful in industry, not only for the purpose of enabling the currently existing equipment to operate at the ideal level of throughput, but also as a new standard of concentration control for which future devices can be designed to exploit.

It is an object of the present invention to overcome or ameliorate the aforementioned drawbacks of the prior art and to provide an improved and/or alternative and/or additional device for automatic and continuous concentration control of a flow of living organism in a fluid. It is one preferred object of the present invention to provide a device comprising in-feed channels for a flow of living organism and a flow of fluid, as well as a chamber containing a lever for regulating the flow from the first and the second in-feed channel through the chamber. Another preferred object of the present invention is to provide a device wherein a computer and a sensor continuously and automatically regulate the ratio of flow from the in-feed channels by the lever in response to the density of living organism in the flow determined by the sensor. Moreover, it is a preferred object of the present invention to provide a method and a device for controlling the concentration of living organism dispersed in fluid in order to facilitate handling said method and a device using a control mechanism having an input for the stream containing uncontrolled concentration of organisms and an input for fluid. Furthermore, the control mechanism receives concentration information from a sensor and adjusts the flow of the organisms by diluting the stream with fluid in response from the computer and based on information from the sensor. It is also a preferred object of the present invention to provide a device with an improved operability and/or an increased ease of use during operation and set up of the device. Preferably, only minor changes to the routine of the personnel are necessary. Also, it is one preferred object of the present invention to avoid long setup times.

The object(s) underlying the present invention is (are) particularly solved by the features defined in the independent claims. The dependent claims relate to preferred embodiments of the present invention. Further additional and/or alternative aspects are discussed below.

The present invention is a new method for controlling the concentration of organisms and a device, a control mechanism to use by the method. The invention also comprises a system for the use of the method and a device in f. ex. fish-farming.

It is the combination of a) using a chamber with a lever regulating the flow from the from the first and the second in-feed channel through the chamber and b) the sensor in the in-feed channel for the flow of living organism, which provides the improved method and device resulting in a more constant concentration of flow of living organisms in a fluid and also allows an increased pump rate. Not only does the invention provide more constant concentration of flow of living organisms in a fluid, but it also provides an automatic and real-time way of controlling concentration of living organisms in a flow of fluid using a sensor and a computer to set the ratio of flow from the first and the second in-feed channel through the chamber and towards the outlet by the lever in response to the density of living organism in the flow determined by the sensor.

Thus, at least one of the preferred objects of the present invention is solved by an apparatus for automatic and continuous concentration control of a flow of living organism in a fluid for further handling. Preferably the apparatus comprises a first in-feed channel for a flow of living organism in a fluid, a second in-feed channel for a flow of fluid, an outlet, and a computer. The apparatus further comprises a chamber containing a lever for regulating the flow from the first and the second in-feed channel through the chamber. Furthermore the apparatus comprises a sensor positioned in the first in-feed channel for detecting the density of living organism in the flow. The computer continuously and automatically regulates the ratio of flow from the first and the second in-feed channel through the chamber and towards the outlet by the lever in response to the density of living organism in the flow determined by the sensor.

Another preferred object of the present invention is solved by a method for automatic and continuous concentration control of a flow of living organism in a fluid for further handling. Preferably, the method comprises the step of feeding a flow of living organism in a fluid through a first in-feed channel, feeding a flow of fluid through a second in-feed channel, and feeding the flow from the chamber trough an outlet.

Moreover, the method preferably comprises the step of regulating the flow from the from the first and the second in-feed channel in a chamber containing a lever, where the density of living organism in the flow is detected by a sensor and the sensor is positioned in the first in-feed channel. Furthermore, a computer continuously and automatically regulates the ratio of flow from the first and the second in-feed channel through the chamber and towards the outlet by the lever in response to the density of living organism in the flow determined by the sensor.

The following embodiments and definitions relate to the method, fish-farm and the apparatus of the invention.

In an embodiment of the present invention the regulation of the ratio of flow from the first and the second in-feed channel through the chamber and towards the outlet is a real time regulation of density by diluting the flow of living organism in fluid in the first in-feed channel with the flow of fluid in the second in-feed channel.

In an embodiment of the present invention, the sensor unit is a light source directing light through the flow of living organism in a fluid and on the opposite side of the light source is an optical sensor, said optical sensor measuring the amount of light that passes through the flow of living organism in a fluid.

In an embodiment of the present invention the first in-feed channel has a fiat section where the light source directing light through the flow of living organism in a fluid is positioned on one broad side of the flat section and the optical sensor is positioned on the other broad side of the flat section.

In an embodiment of the present invention the method and device for controlling the concentration of living organism in water is characterized by a control mechanism having an input for the stream containing uncontrolled concentration of organisms and a input for water, the control mechanisms receiving information on the concentration of organisms from a sensor situated upstream in the organisms-containing stream; the control mechanism adjusts the flow of the organisms by diluting the stream with water according to the measures form the sensor which results in the output from the control mechanism being a stream with controlled concentration of organisms.

In an embodiment of the present invention the two inputs of the control mechanism, one for the stream containing uncontrolled concentration of organisms and a one for water or fluid, both lead to a chamber containing a lever that divides the chamber and a motor that adjusts the position of the lever and thus controls the amount of water used to dilute the organism-containing fluid. Said motor receives input from a sensor situated upstream from the control mechanism in the stream of organisms.

In an embodiment of the present invention the sensor unit consists of a light source that shines through the fluid-stream and on the opposite side an optical sensor that measure the amount of light that passes through.

In an embodiment of the present invention the organisms in the stream is selected from, but not limited to fish, smolt, shrimp, crustaceans, shellfish or other organisms living in freshwater or sea.

In one embodiment of the invention, the system for counting organisms consists of the following elements:

1. A reservoir containing living organisms in fluid, such as fish in sea-water.
2. A reservoir containing fluid only, e.g. water or sea-water
3. A sensor unit that measures the concentration of organisms in the fluid using a light source such as an infrared diode plate that shines through the fluid-stream and with a plate on the opposite side with receptors that measure the amount of light that passes through.
4. A control mechanism that, based on the measurements of the sensor unit, controls the amount of water used to dilute the stream of organisms-containing fluid and thus to affect the speed of the fluid and the concentration of organisms in the fluid.
5. A pump
6. A grader that grades the organisms by size
7. A device that counts the organisms In the present context the term "control mechanism" relates to a chamber for receiving a flow of living organisms in fluid and a flow of fluid, where the concentration of living organisms in fluid is determined by continuously and automatically regulating the ratio of flow of living organisms in fluid and a flow of fluid respectively through the chamber. The use of method and device is not limited to sorting and counting but can be used to achieve better results in various tasks relating to the handling of living organisms. The stream of controlled concentration coming from the control mechanism, e.g. with the fish spaced apart, can be used to handle the fish in many different ways such as medicating, vaccinating, weighing or making other estimations. The system, method and device can be used for controlling concentration of organisms in a wide range of size and for various species, e.g. for fish, smolt, shrimp, crustaceans, shellfish or other waterborne organisms.

In the present context the term "lever" relates to a beam, a rod or an arm on a hinge or the like, which is positioned centrally between two in-feed channels. The lever is movable by a motor or the like and as the position of the lever is moved, the flow from one in-feed channel is limited, whereas the flow from the second in-feed channel is free and unhindered. An embodiment of a lever is shown in FIGS. 7 and 8.

DETAILED DESCRIPTION OF THE INVENTION

The present invention will become more fully understood from the detailed description given hereinafter and the accompanying drawings which are given by way of illustration only, and thus, are not limitative of the present invention, and wherein.

Figure 6:
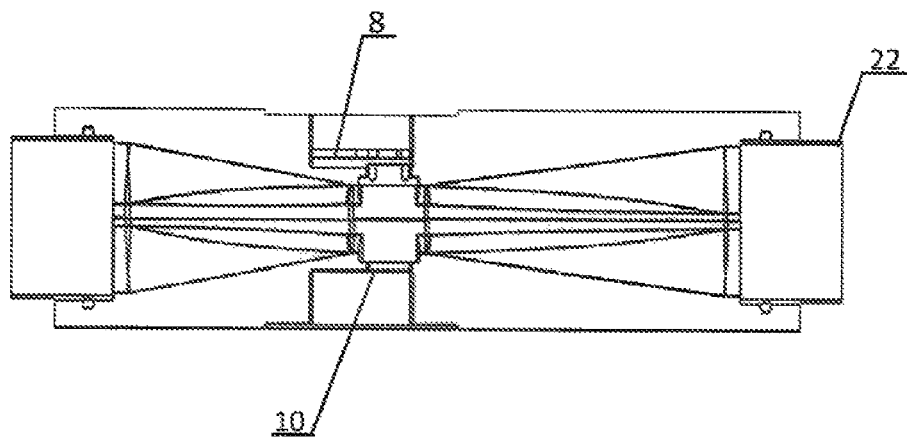

FIG. 6 Side-view of concentration sensor.

Figure 7:
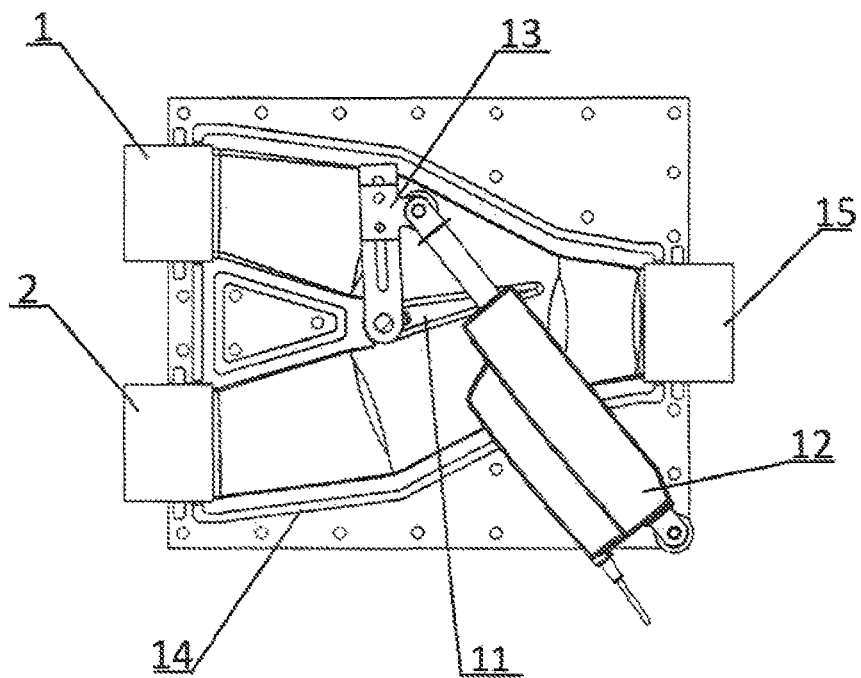

FIG. 7 shows a top-view of control device.

Figure 8:
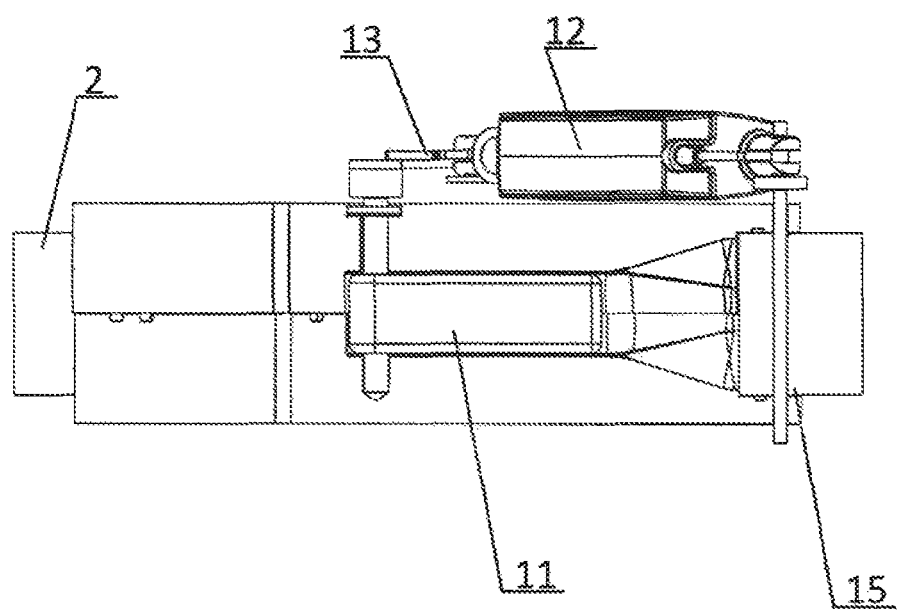

FIG. 8 shows a side-view of control device.

Figure 9:
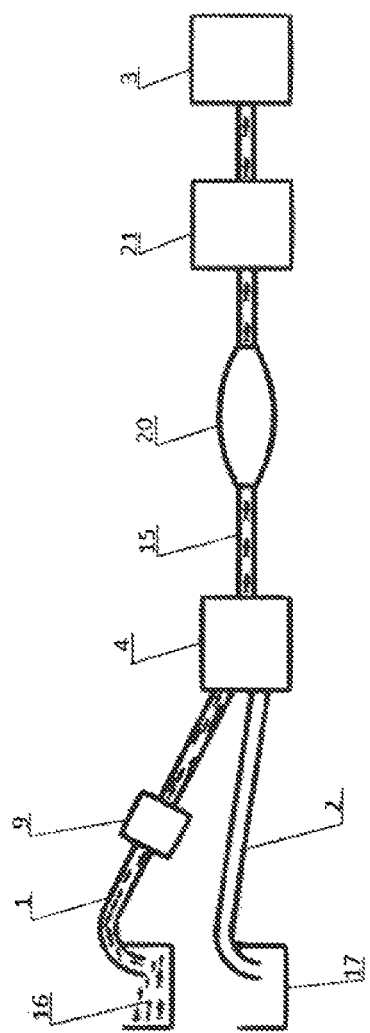

FIG. 9 shows an over-view of fish grading and counting system.

Figure 1:
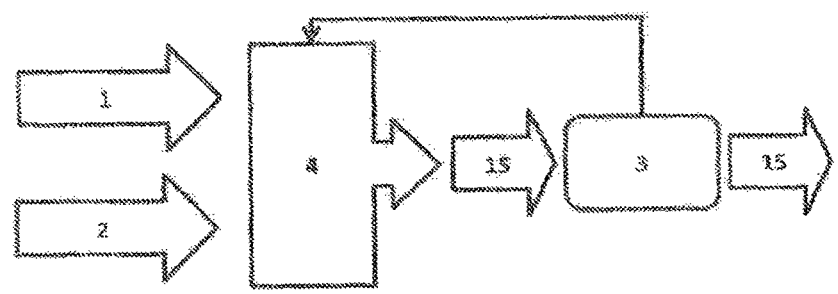
FIG. 1 shows a flowchart showing an alternative system to control the concentration of fish in water, not an embodiment of the disclosed invention.

FIG. 1 shows a flowchart of an alternative system setup that aims at controlling the concentration of fish in water pumped through a pipe. The system is not an embodiment of the invention but is shown here for reference.

Fluid with an uncontrolled concentration of fish (1) is pumped into a control mechanism (4) which dilutes the concentration by adding water (2) into the pipe. The output of the control mechanism is a pipe containing water with a controlled concentration of fish (15). The control mechanism (4) receives concentration information from a fish counter (3) located downstream from the control unit.

During testing, the system described in FIG. 1 proved to be able to eliminate periods of sustained high density but the system proved unable to respond to sudden peaks of high concentration, which causes negative effects on the quality of fish counting. This is at least partly due to the order in which the fish flow through the equipment e.g. that the counter (3) measuring concentration is located downstream from the control mechanisms (4).

Figure 2:
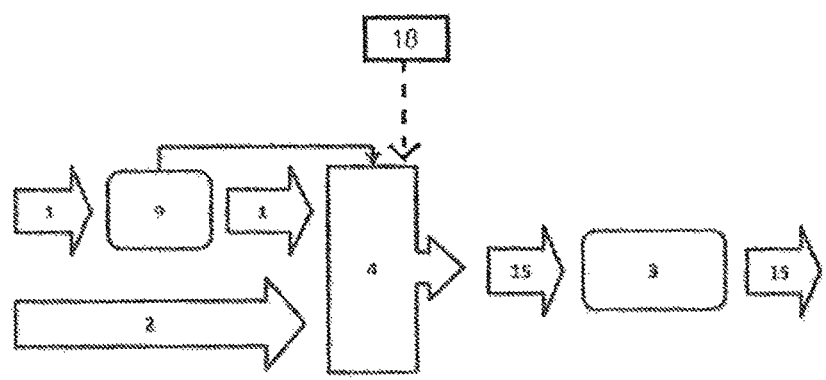
FIG. 2 shows a flowchart showing a system to control the concentration of fish in water which is the subject of the disclosed invention.

FIG. 2 shows a flowchart of the system setup for the disclosed invention. Fluid with uncontrolled concentration of fish (1) is pumped via a pipe, through a concentration sensor (9) and onward towards the concentration control mechanism (4). After receiving information from the concentration sensor (9), the control mechanism (4) adds water (2) into the pipe and thus dilutes the concentration of fish. The output of the control mechanism (4) is a stream of fluid with a controlled concentration of fish (15).

The concentration sensor (9) functions similar to the counter (3) as it spreads out the flow within the pipeline and passes it by a light source. A board with infrared light sensitive transistors (8) measures the concentration of fish within the pipeline by analyzing the silhouette recorded when fish pass by the light source.

Figure 3:
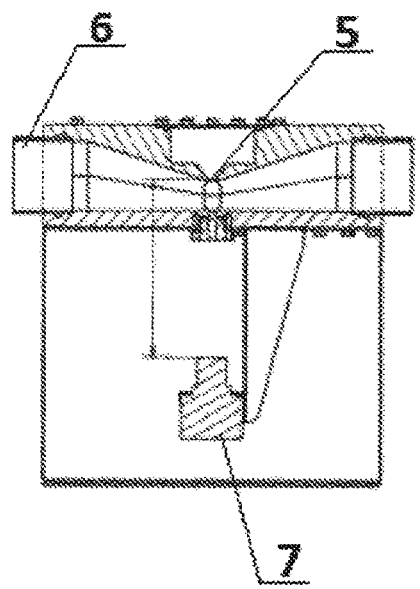
FIG. 3 shows a top-view of fish counter.

FIG. 3 is a detailed illustration of a fish counter (3). Fluid containing fish is pumped through an input on the counter (6) and past a light source (5). The shape of the chamber within the counter spreads out the flow vertically which allows for greater accuracy. A camera (7) photographs the stream and image analysis software calculates the number of fishes that pass through the fish counter.

Figure 4:
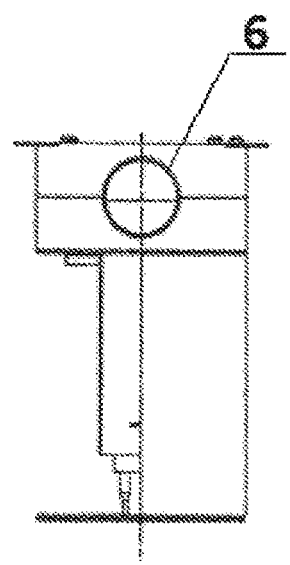
FIG. 4 shows a side-view of fish counter.

FIG. 4 is a side-view illustration of a fish counter (3) where the input is show as 6.

Figure 5:
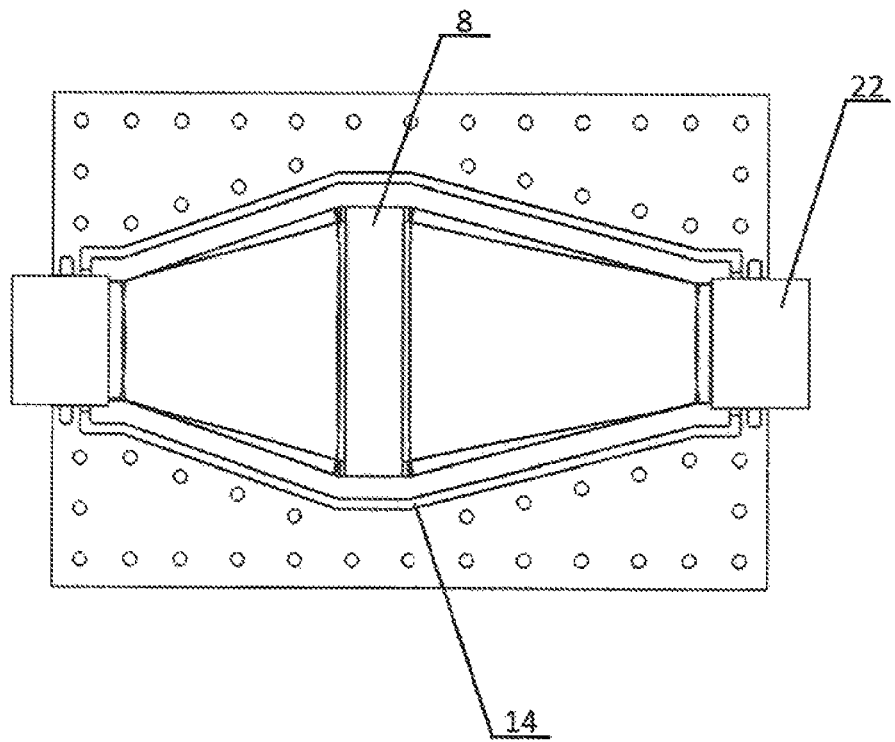
FIG. 5 shows a top-view of concentration sensor.

FIG. 5 is a detailed illustration of the concentration sensor (9). Water with an uncontrolled concentration of organisms enters at the input of the sensor (22) and flows past a board with infrared light emitting diodes beneath the surface not shown in this drawing, see (10) in FIG. 6. The silhouette created by fish moving past the light source (10) is measured by a board with infrared sensitive transistors (8) and image analysis software calculates the concentration of the flow that passes through the sensor. The sensor is contrived from two halves, joined together and forming a chamber for imaging. A sealing O-ring (14) water-proves the chamber created by the two halves.

FIG. 6 is a side-view of the concentration sensor (9). A board with infrared light emitting diodes (10) is shown beneath the camera and the input flow to the sensor is shown as (22).

FIG. 7 is a top-view of the control mechanism (4). Fluid with uncontrolled concentration of fish (1) is pumped into one of the inputs of the control mechanism (4) and water (2) is pumped into the other input. Shown here is a linearized motor (12) that moves a lever (11) in order to adjust the ratio by which the stream with uncontrolled concentration of fish is diluted with water to secure that the output is a stream with controlled concentration of fish (15). The gearing ratio between the movement of the linearized motor (12) and the lever (11) is adjusted by changing the position of the connection on the shaft of the lever (13). A computer (18) continuously and automatically regulates the ratio of flow from the input of uncontrolled concentration of fish (1) and the input of water (2) through the chamber and towards the output (15) by the lever (11) in response to the density of living organisms in the flow determined by the sensor (9). The mechanism is contrived from two halves fastened together and a sealing O-ring (14) water-proves the chanter created by the two halves.

FIG. 8 is a side-view of the control mechanism (4) where the lever (11) and the linearized motor (12) is shown as well as the connection on the lever shaft (13), that produces a controlled concentration of fish flowing through the output (15). Water input is shown as (2).

FIG. 9 shows an overview of an entire process of grading and counting fish with concentration control. Water with uncontrolled concentration of fish (1) is pumped from a tank (16), through a concentration sensor (9). From there the stream flows towards the concentration control mechanism (4) where water (2), which is pumped from a tank (17), is added to the flow in order to dilute the concentration by a controlled manner to ensure an output of controlled concentration of fish (15). From there the stream flows towards a pump (20) that propels the entire process forward. Downstream from the pump, the water flows into a grader (21) which sorts the fish by size and distributes it onto several slides that lead into the fish counter (3).

The invention is useful for all kinds of organism in fresh-water or in sea-water. It can be used for controlling concentration of organisms in a wide range of size and for various species, e.g. for fish, smolt, shrimp, crustaceans, shellfish or other waterborne organisms. The concentration control mechanisms can facilitate all kinds of handling of the organisms other than grading or counting e.g. medicating, vaccinating, weighing or making other estimations.

The present invention covers further embodiments with any combination of features from different embodiments described above. Reference signs in the claims are provided merely as a clarifying example and shall not be construed as limiting the scope of the claims in any way. The present invention also covers the exact terms, features, values and ranges etc. in case these terms, features, values and ranges etc. are used in conjunction with terms such as about, around, generally, substantially, essentially, at least etc. (i.e., "about 3" shall also cover exactly 3 or "substantial constant" shall also cover exactly constant). The terms "a", "an", "first", "second" etc do not preclude a plurality.

The invention claimed is:

1. An apparatus for automatic and continuous concentration control of a flow of living organisms for further handling, the apparatus comprising:
   a first in-feed channel for a flow of living organisms;
   a second in-feed channel for a flow of fluid;
   a chamber containing a lever for regulating the flows from the first and the second in-feed channels through the chamber, the lever dividing the chamber and being positioned between the first and second in-feed channels;
   an outlet;
   a sensor positioned in the first in-feed channel for detecting a density of living organisms in the flow of living organisms; and
   a computer, wherein the computer continuously and automatically regulates a ratio of the flows from the first and the second in-feed channels through the chamber and towards the outlet by adjusting a position of the lever in response to the density of living organisms in the flows determined by the sensor.

2. The apparatus according to claim 1, wherein the sensor is a light source directing light through the flow of living organisms and on an opposite side of the light source is an optical sensor, the optical sensor measuring an amount of light that passes through the flow of living organisms.

3. The apparatus according to claim 2, wherein the first in-feed channel has a flat section where the light source directing light through the flow of living organisms is positioned on one broad side of the flat section and the optical sensor is positioned on an ther broad side of the flat section.

4. The apparatus according to claim 2, wherein the light source includes infrared light emitting diodes and the optical sensor includes infrared sensitive transistors.

5. The apparatus according to claim 1, wherein the lever is positioned centrally between the first and second in-feed channels.

6. The apparatus according to claim 1 and further comprising a motor that moves the lever.

7. The apparatus according to claim 6 and further comprising a lever shaft, wherein the motor moves the lever along the lever shaft to adjust the position of the lever within the chamber.

8. A method for automatic and continuous concentration control of a flow of living organisms for further handling, the method comprising:
   feeding a flow of living organisms through a first in-feed channel;
   feeding a flow of fluid through a second in-feed channel;
   regulating the flows from the first and the second in-feed channels in a chamber containing a lever that divides the chamber and is positioned between the first and second in-feed channels;
   feeding the regulated flows from the chamber through an outlet;
   detecting a density of living organisms in the flow of living organisms by a sensor, the sensor being positioned in the first in-feed channel; and
   continuously and automatically regulating, via a computer, a ratio of the flows from the first and the second in-feed channels through the chamber and towards the outlet by adjusting a position of the lever in response to the density of living organisms in the flow of living organisms determined by the sensor.

9. The method according to claim 8, wherein the regulation of the ratio of flows from the first and the second in-feed channels through the chamber and towards the outlet is a real time regulation of density by diluting the flow of living organisms in the first in-feed channel with the flow of fluid in the second in-feed channel.

10. The method according to claim 8, wherein the living organisms comprise at least one of fish, smolt, shrimp, crustaceans, shellfish or other organisms living in freshwater or sea.

11. The method according to claim 8 for use in fish-farming.

12. The method of claim 8, wherein detecting the density of living organisms in the flow of living organisms by the sensor includes:
   directing light from a light source through the flow of living organisms in the first in-feed channel,
   positioning an optical sensor on an opposite side of the light source, and
   analyzing silhouettes recorded by the optical sensor when fish pass by the light source.

13. A fish farm comprising an apparatus for determining density or number of living organisms in a flow for further handling, the apparatus comprising:
   a first in-feed channel for a flow of living organisms;
   a second in-feed channel for a flow of fluid;
   a chamber containing a lever for regulating the flows from the first and the second in-feed channels through the chamber, the lever dividing the chamber and being positioned between the first and second in-feed channels;
   an outlet;
   a sensor positioned in the first in-feed channel for detecting a density of living organisms in the flow of living organisms; and
   a computer,
   wherein the computer continuously and automatically regulates a ratio of flows from the first and the second in-feed channels through the chamber and towards the outlet by adjusting a position of the lever in response to the density of living organisms in the flows determined by the sensor.

14. The fish farm according to claim 13, wherein the sensor includes a light source directing light through the flow of living organisms and on an opposite side of the light source is an optical sensor, the optical sensor measuring the amount of light that passes through the flow of living organisms.

15. The fish farm according to claim 13, wherein the first in-feed channel has a flat section where a light source directing light through the flow of living organisms is positioned on one broad side of the flat section and an optical sensor is positioned on an other broad side of the flat section.

* * * * *